(12) United States Patent
Taylor et al.

(10) Patent No.: US 7,136,470 B1
(45) Date of Patent: Nov. 14, 2006

(54) AD RINGER

(75) Inventors: William Scott Taylor, Duluth, GA (US); David E. Massengill, Covington, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 380 days.

(21) Appl. No.: 10/253,838

(22) Filed: Sep. 24, 2002

(51) Int. Cl.
*H04M 15/00* (2006.01)
*H04M 3/42* (2006.01)
*H04M 7/00* (2006.01)

(52) U.S. Cl. .................... 379/114.13; 379/201.02; 379/207.02; 379/221.08; 379/221.11

(58) Field of Classification Search ............... 379/76, 379/114.1, 114.12, 114.13, 207.02, 207.03, 379/221.01, 213.01, 221.09, 201.02, 207.11, 379/207.14, 221.11
See application file for complete search history.

(56) References Cited

U.S. PATENT DOCUMENTS

| | | | | |
|---|---|---|---|---|
| 4,850,007 | A * | 7/1989 | Marino et al. | 379/114.13 |
| 5,652,784 | A * | 7/1997 | Blen et al. | 379/67.1 |
| 6,014,439 | A * | 1/2000 | Walker et al. | 379/266.01 |
| 6,038,305 | A | 3/2000 | McAllister | |
| 6,088,440 | A | 7/2000 | Millar et al. | |
| 6,351,639 | B1 | 2/2002 | Motohashi | |
| 6,385,308 | B1 * | 5/2002 | Cohen et al. | 379/88.23 |
| 6,418,330 | B1 | 7/2002 | Lee | |
| 6,567,658 | B1 * | 5/2003 | Van De Graaf | 455/412.1 |
| 6,603,844 | B1 * | 8/2003 | Chavez et al. | 379/114.13 |
| 6,608,891 | B1 * | 8/2003 | Pelletier et al. | 379/207.02 |
| 6,665,390 | B1 | 12/2003 | Ekstrom | |
| 6,829,233 | B1 * | 12/2004 | Gilboy | 370/352 |
| 6,856,673 | B1 * | 2/2005 | Banks et al. | 379/114.13 |
| 2001/0048737 | A1 * | 12/2001 | Goldberg et al. | 379/114.13 |
| 2002/0114437 | A1 * | 8/2002 | Nabkel et al. | 379/201.01 |
| 2002/0131574 | A1 | 9/2002 | Alleman | |
| 2003/0002657 | A1 | 1/2003 | Seelig et al. | |
| 2003/0086558 | A1 * | 5/2003 | Seelig et al. | 379/373.01 |
| 2004/0067751 | A1 | 4/2004 | Vandermeijden | |

OTHER PUBLICATIONS

John Tagliabue, "Europe Offering Free Calls But First, a Word from . . . ", New York Times, Sep. 28, 1997.

\* cited by examiner

*Primary Examiner*—Quoc Tran
(74) *Attorney, Agent, or Firm*—Merchant & Gould

(57) ABSTRACT

A method and system are provided for playing an advertisement to a telephone subscriber prior to call completion in a telecommunications network. A subscriber telephone line is provisioned to provide an advertisement. A switch in the telecommunications network detects an off-hook condition at the subscriber's telephone and interprets the digits of the telephone number of a called party dialed by the subscriber. The switch then retrieves an advertisement and plays the advertisement to the subscriber instead of generating a ringing tone prior to call completion. The switch may also play the advertisement instead of a dial tone. The advertisement may be stored in an advertisement module in the switch or in a network component in the telecommunications network. The period for playing the advertisement may be extended by delaying call processing at the network component. Once the advertisement begins playing, the subscriber may terminate the advertisement by depressing a key on a telephone keypad. The switches and network components in the telecommunications network may be advanced intelligent network (AIN) components.

18 Claims, 3 Drawing Sheets

AD RINGER

FIELD OF THE INVENTION

The present invention relates to providing an advertisement in lieu of a ringing tone to a subscriber in a telecommunications network.

BACKGROUND OF THE INVENTION

In modem telecommunications systems, a ringing tone is heard on a subscriber's telephone while the subscriber is waiting to speak to a called party. In a typical telecommunications system, the ringing tone is generated remotely from the subscriber's telephone as part of normal call processing before the call is completed. If the party called by the subscriber does not immediately answer the telephone, however, the subscriber may be required to listen to a series of ringing tones before the telephone call is completed (e.g., answered by the called party, routed to voicemail, etc.).

Often, a subscriber would prefer to hear information, such as an advertisement, rather than a ringing tone when waiting for a telephone call to be answered. The information could be paid for and provided by advertisers in exchange for reduced calling costs to the subscriber. For example, a new subscriber might need information on the location of local restaurants available in the subscriber's calling area. In this scenario, the subscriber would have to consult a local restaurant guide or other resource for this information. Accordingly, there is a need for a method and system for providing information, such as an advertisement, to a telephone subscriber prior to call completion in a telecommunications network.

SUMMARY OF THE INVENTION

Embodiments of the present invention are directed to a method and system for providing an advertisement to a telephone subscriber prior to call completion in a telecommunications network. A subscriber telephone line is assigned an advertisement tag in an originating switch in the telecommunications network. Once the subscriber dials a telephone number to call another party, a message is sent containing the advertisement tag to a network component to start call processing. In response to the message, the network component retrieves a stored advertisement to send to the originating switch for playback to the subscriber until the telephone call is answered. The advertisement may be played to the subscriber instead of a ringing tone until the called party answers the telephone. The period for playing the advertisement may be extended by delaying call processing at the network component. Once the advertisement begins playing, the subscriber may terminate the advertisement by depressing a key on a telephone keypad. The switches and network components in the telecommunications network may be advanced intelligent network (AIN) components.

According to another embodiment, the telecommunications network does not utilize AIN components and the advertisement is stored and played from a terminating switch in the network.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

The following description of an embodiment of the present invention is made with reference to the above-described drawings wherein like numerals refer to like parts or components throughout the several figures. The present invention is directed to a method and system for providing an advertisement to a telephone subscriber prior to call completion in a telecommunications network.

Operating Environment

Figure 1:
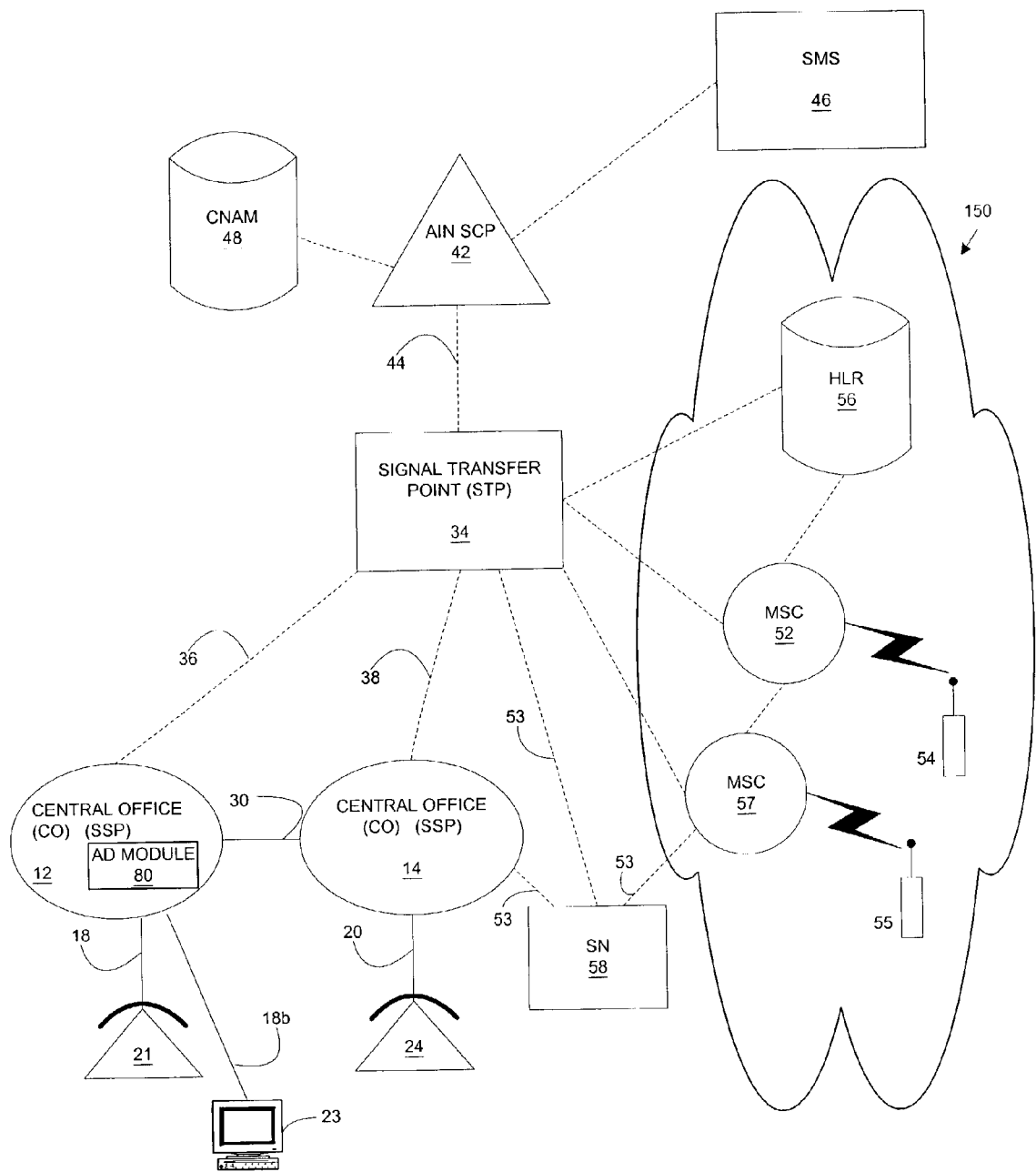
FIG. 1 is a simplified block diagram illustrating components of a wireline and wireless telecommunications network that provides an operating environment for the present invention.

FIG. 1 is a block diagram illustrating components of a wireline and wireless telephone network that provides an exemplary operating environment for the present invention. The public switched telephone network that evolved in the 1980s incorporated the advanced intelligent network (AIN). Some of the components of the advanced intelligent network are illustrated in FIG. 1. FIG. 1 is illustrative of at least a part of the advanced intelligent network (AIN) of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as the trunk circuit 30.

As shown in FIG. 1, switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. A computer 23 also is illustrated as connected to the switch 12 via the subscriber line 18(b). The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point (STP) 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN are provided by regional STPs (not shown) and regional SCPs (not shown). The STP 34 is connected to the SSPs via connections 36, 38 and 40. Both the regional SCPs and the local SCP 42, which represent a plurality of local SCPs distributed throughout the AIN, are connected via respective data links to the SMS 46. The SMS 46 provides a centralized platform for remotely programming the various SCPs of the AIN so that a coordinated information processing scheme may be implemented for the AIN.

The modem Advanced Intelligent Network also includes service nodes (SN) such as the service node 58. Those skilled in the art are familiar with service nodes, which are physically implemented by the same types of computers that embody the SCP 42. In addition to the computing capability and data base maintenance features, service nodes 58 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 53 to SSP 12, ISDN/SS7 protocol conversion in SSP 12, and SS7 links 38 and 44. According to a preferred embodiment, the ISDN links 53 serve as a primary rate interface (PRI) over which services may be provided to subscribers using wireline services such as the wireline telephone sets 21 and 24 and subscribers using wireless services such as the wireless units 54, 55, 60, and 62.

The wireless network 150, such as a cellular network, comprises a mobile switching center (MSC) 52. The MSC 52 is a switch providing services and coordination between wireless users in the network 150 and external networks. The MSC 52 may be connected to the STP 34 to provide information to the wireline network and receive information from the wireline network. The MSC 52 also communicates with a wireless subscriber, such as wireless telephones 54 and 55. The wireless telephones 54 and 55 are also illustrative of other wireless computing devices, such as pagers and personal digital assistants.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the commmunication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

SSP 12 (the originating switch) also includes an advertising module 80 for storing and playing advertisements. Advertising module 80 may be a recording playback device for playing back recorded analog voice messages in digitized forms such as WAV or MP3 files. Although advertising module 80 is shown in FIG. 1 as being functionally integrated in SSP 12, in an alternative embodiment, advertising module 80 may also be functionally connected to the SSP as a component of the network. In this embodiment, advertising module 80 may be connected to SSP 12 via a PRI interface line similar to the connection 53 used to connect service node 58 to SSP 14. The originating switch may be provisioned by the subscriber's exchange carrier to play advertisements through advertising module 80 to the subscriber in exchange for reduced or discounted service. The advertisements may be pre-recorded WAV or MP3 audio files.

Operation

Having described an operating environment for the present invention with reference to FIG. 1, the following is a description of a logical flow of the steps performed by a method and system of the present invention for providing an advertisement to a subscriber prior to call completion in an intelligent telecommunications network.

Figure 2:
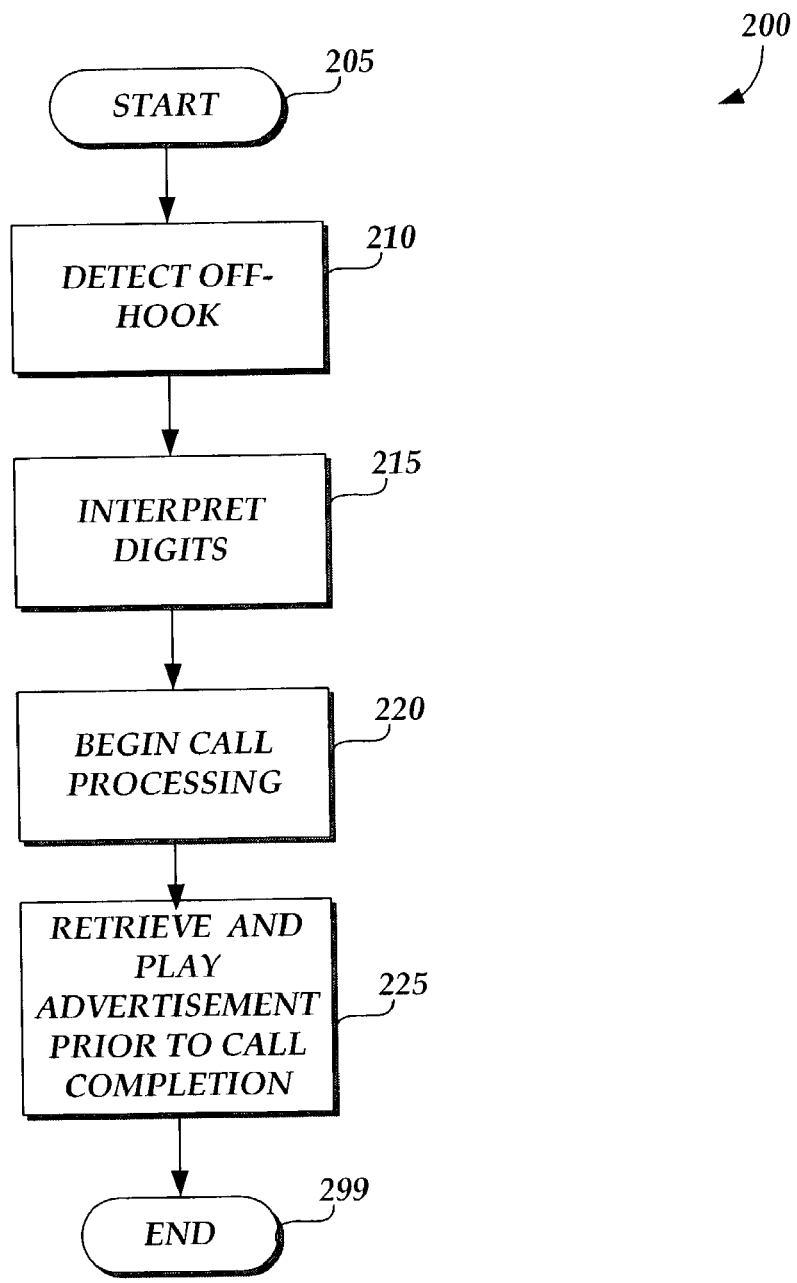
FIG. 2 illustrates a logical flow of the steps performed by a method and system of the present invention for providing an advertisement to a telephone subscriber prior to call completion in a telecommunications network.

Referring then to FIG. 2, the method 200 begins at start step 205 and proceeds to step 210 where an originating switch (i.e., SSP 12 or MSC 52) detects an off-hook condition caused by a subscriber in preparation of making a telephone call. At step 215, the originating switch interprets each digit entered by the subscriber until it is able to determine how the call is to be processed by STP 34. For example, the originating switch may interpret the first seven or ten digits of the telephone number before messaging STP 34 that the call is a local call.

Once the originating switch has interpreted enough digits, it forms an SS7 message to send through STP 34 (over SS7 link 36) to SCP 42 to begin call processing at step 220. At the same time call processing is taking place, the originating switch retrieves an advertisement to play over the subscriber's line at step 225. In this embodiment, the advertisement may be stored in advertisement module 80. The advertisement is played to the subscriber until the call is completed (i.e., the party called by the subscriber picks up the telephone). For example, the subscriber may be provided with an announcement such as "While you are waiting to be connected, please consider visiting our restaurant in your area." In this embodiment, the advertisement is played instead of the ringing tone normally generated by the switch prior to call completion. Call completion occurs when the terminating switch (14 or 57 in FIG. 1) detects an off-hook condition (i.e., the called party answers the telephone). In another embodiment, the originating switch may immediately play the advertisement to the subscriber after the off-hook condition is detected at step 210. In this alternate embodiment, the advertisement is played instead of the dial tone normally generated by the switch when detecting an off-hook condition. In another embodiment, the originating switch may delay sending the SS7 message to begin call processing in step 200. This is advantageous in that it allows the playback of longer advertisements to the subscriber prior to call completion. The method 200 then ends at step 299.

Figure 3:
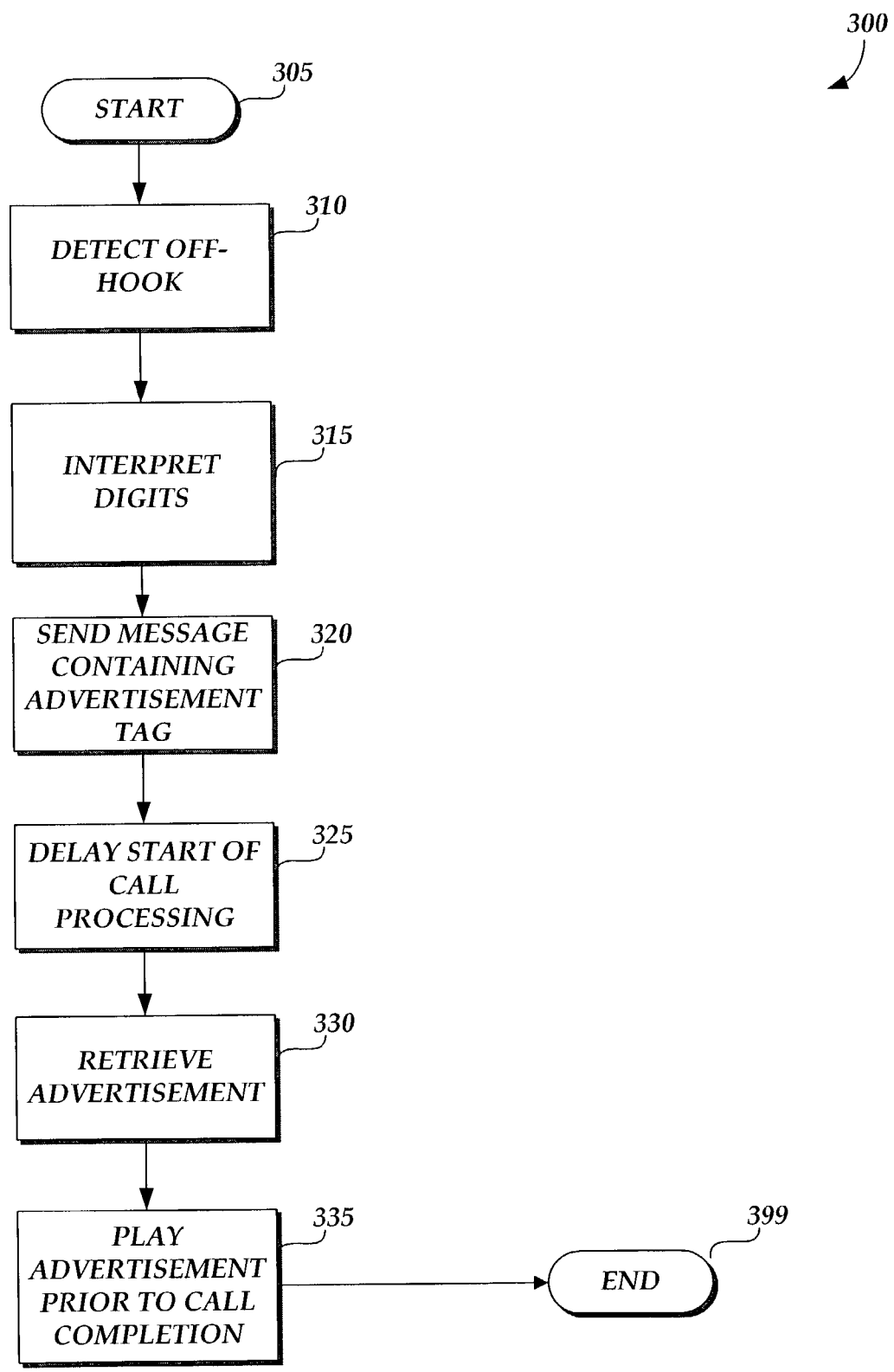
FIG. 3 illustrates a logical flow of the steps performed by a method and system of the present invention for providing an advertisement to a telephone subscriber prior to call completion in a telecommunications network according to an alternate embodiment of the invention.

FIG. 3 illustrates a logical flow of the steps performed by a method and system of the present invention for providing an advertisement to a telephone subscriber prior to call completion in a telecommunications network according to an alternate embodiment of the invention.

Referring then to FIG. 3 the method 300 begins at start step 305 and proceeds to step 310 where an originating switch (i.e., SSP 12 or MSC 52) detects an off-hook condition caused by a subscriber in preparation of making a telephone call. At step 315, the originating switch interprets each digit entered by the subscriber until it is able to determine how the call is to be processed by STP 34.

Once the originating switch has interpreted enough digits, it forms an SS7 message to send through STP 34 (over SS7 link 36) to SCP 42 at step 320. The SS7 message may include an advertisement tag. In this embodiment, the advertisement tag may be assigned to the subscriber's telephone number by the subscriber's local exchange carrier indicating that the subscriber is to receive advertisements. The implementation of the advertisement tag may be similar to the implementation of a PIC code in a switch, the implementation of which is known to those skilled in the art.

At step 325, the originating switch delays the start of call processing by waiting for a predetermined time period (e.g., 60 seconds) to send the corresponding SS7 message to SCP 42. The delay increases the amount of time available for playing the advertisement.

At step 330, the SCP 42, after receiving the SS7 message containing the advertising tag from the STP 34, recognizes the advertisement tag and retrieves a stored advertisement. In this embodiment, the advertisement may be a prerecorded WAV or MP3 audio file stored in the SCP.

Once the SCP 42 retrieves the advertisement, the advertisement is sent in an SS7 message through STP 34 to the switch for playback to the subscriber. At step 335, the switch begins playing the advertisement to the subscriber prior to call completion (i.e., the party called by the subscriber picks up the telephone). In this embodiment, the advertisement is played in the place of the ringing tone normally played by the switch prior to call completion. The method 300 ends at step 399.

Although the embodiments of the invention described in FIGS. 2 and 3 above utilize an SCP for call processing and storing advertisements (FIG. 3), it should be understood that the invention is not limited to this network component. For example a service node (SN) may also be utilized to perform the functions of the SCP in the above-described embodiments. The subscriber may also have the option to cancel the playback of the advertisement by depressing a key such as the * key on the telephone keypad.

In another embodiment of the invention, the advertisement may be provided in a non-AIN network. The non-AIN network may include an originating switch and a terminating switch which are connected by a trunk circuit. The non-AIN network may also include toll-tandem switches. The components of a traditional or non-AIN network are known to those skilled in the art. In the non-AIN network, the advertisement is stored on and played to the subscriber from the terminating switch or toll tandem switch.

It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method for providing an advertisement to a subscriber prior to call completion in a telecommunications network, the method comprising:

detecting an off-hook condition for the subscriber in the network prior to calling a party;

after detecting the off-hook condition, interpreting digits of a telephone number entered by the subscriber for calling the party;

after interpreting the digits of a telephone number, sending a message including an advertisement tag from an originating switch in the telecommunications network, wherein the advertisement tag is assigned to a telephone number associated with the subscriber and indicates that the subscriber is authorized to receive advertisements;

retrieving a stored advertisement in response to receiving the message including the advertisement tag; and providing the advertisement to the subscriber in lieu of generating a ringing tone while waiting to complete a call to the party.

2. The method of claim 1, further comprising:

delaying call processing for a predetermined period.

3. The method of claim 1, wherein retrieving the advertisement comprises retrieving the advertisement from a network component in the telecommunications network.

4. The method of claim 3 further comprising:

receiving a message containing the advertisement from the network component.

5. The method of claim 4, wherein the network component is a service control point (SCP).

6. The method of claim 4, wherein the network component is a service node (SN).

7. The method of claim 1, wherein completing a call to the party comprises detecting until an off-hook condition for the called party in the network.

8. The method of claim 1, further comprising terminating the advertisement by depressing a predetermined key on a telephone keypad.

9. A system for providing an advertisement to a subscriber prior to call completion in an intelligent telecommunications network, the system comprising:

means for detecting an off-hook condition for the subscriber in the network;

means for sending a message including an advertisement tag to an intelligent network component after interpreting digits of a telephone number entered by the subscriber for calling a party, wherein the advertisement tag is assigned to a telephone number associated with the subscriber and indicates that the subscriber is authorized to receive advertisements;

means for receiving a message including an advertisement from the intelligent network component; and means for forwarding the advertisement to the subscriber in lieu of generating a ringing tone until call completion.

10. The system of claim 9, further comprising means for:

sending a message to the first intelligent network component to begin call processing.

11. The system of claim 10, further comprising means for delaying sending the message to the first intelligent network component to begin call processing for a predetermined period.

12. The system of claim 10, wherein the message is an SS7 message.

13. The system of claim 9, wherein the means for detecting an off-hook condition, sending a message including an advertisement tag to an intelligent network component, receiving a message including an advertisement from the intelligent network component, and forwarding the advertisement to the subscriber in lieu of generating a ringing tone until call completion, is a switching service point (SSP).

14. The system of claim 9, wherein the means for detecting an off-hook condition, sending a message including an advertisement tag to an intelligent network component, receiving a message including an advertisement from the intelligent network component, and forwarding the advertisement to the subscriber in lieu of generating a ringing tone until call completion, is a mobile switching center (MSC).

15. The system of claim 9, wherein the intelligent network component is a service control point (SCP).

16. The system of claim 9, wherein the intelligent network component is a service node (SN).

17. The system of claim 9, further comprising means for forwarding the advertisement until an off-hook condition is detected by a terminating switch.

18. The system of claim 9, wherein the forwarding of the advertisement is canceled by depressing a predetermined key on a telephone keypad.

* * * * *